Feb. 15, 1927.
L. E. WALTER
SCOOTER VEHICLE
Filed Sept. 25, 1925
1,617,357
2 Sheets-Sheet 1
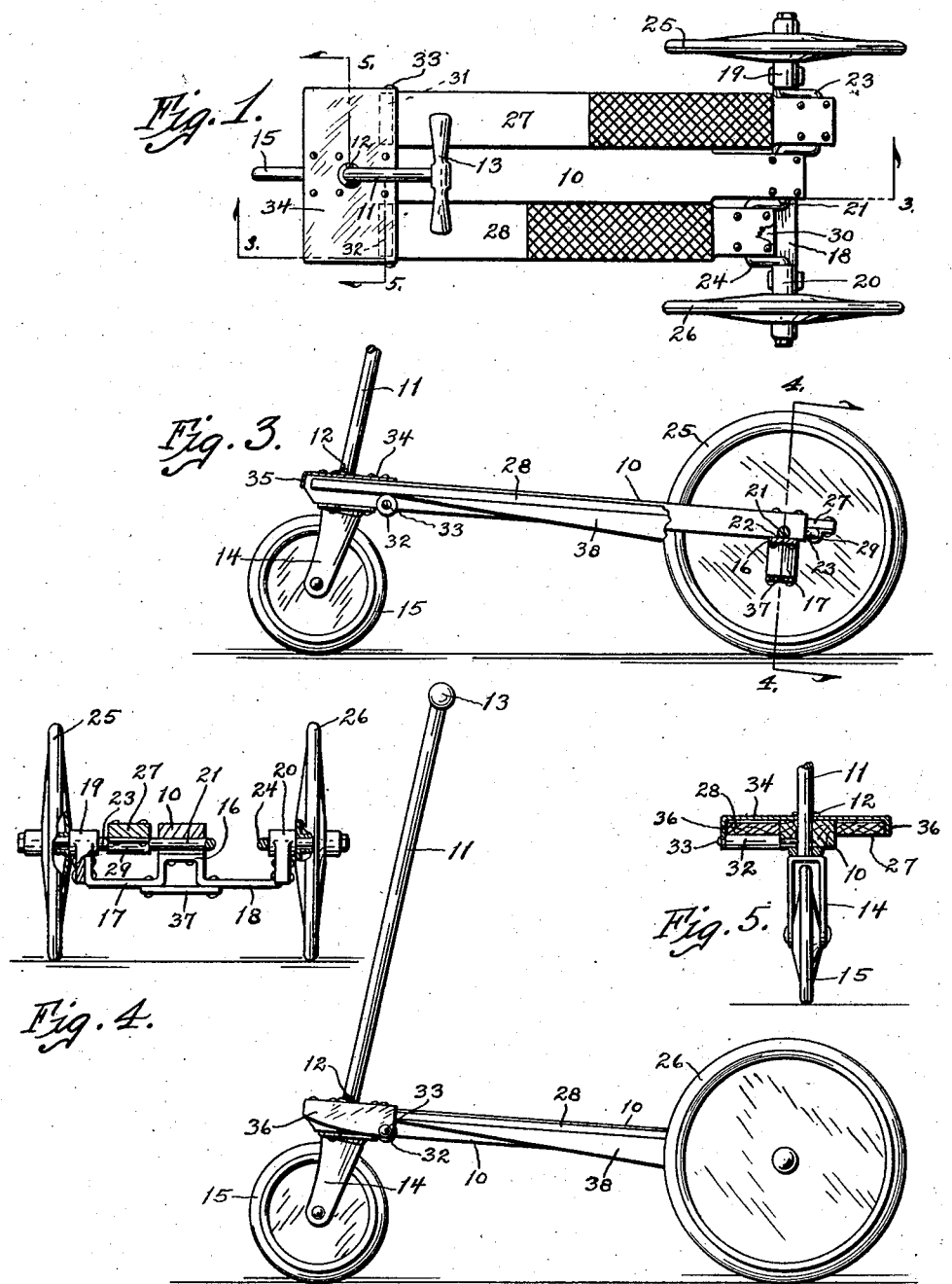
INVENTOR
L. E. WALTER
BY Earl M. Sinclair
ATTORNEY Feb. 15, 1927. 1,617,357
L. E. WALTER
SCOOTER VEHICLE
Filed Sept. 25, 1925 2 Sheets-Sheet 2

INVENTOR
L. E. WALTER
BY
Earl M. Sinclair
ATTORNEY

Patented Feb. 15, 1927.

1,617,357

UNITED STATES PATENT OFFICE.

LOWELL E. WALTER, OF DES MOINES, IOWA.

SCOOTER VEHICLE.

Application filed September 25, 1925. Serial No. 58,519.

This invention relates to and is an improvement on the devices illustrated, described and claimed in my application filed August 25, 1924, Serial Number 733,955, to which reference hereby is made.

The principal object of this invention is to provide means for simplifying the construction by causing the rigid plate to be employed also as the longitudinal portion of the frame of the machine.

A further object is to provide a cover or guard for the forward ends of the reciprocating pedal plates.

A further object is to provide an improved form for the rear frame member which provides a support and bearing for the crank axle and also for the rigid foot plate.

A further object is to provide an improved form employing only two wheels, with various modifications of the frame incident thereto.

With these and other objects in view, my invention consists in the construction, arrangement and combination of elements hereinafter set forth, pointed out in the claims and illustrated by the accompanying drawing, in which—

Figure 1 is a plan view of one form of the device.

Figure 2 is a side elevation of the same.

Figure 3 is a longitudinal sectional elevation on the line 3—3 of Figure 1.

Figure 4 is a cross-section on the line 4—4 of Figure 3.

Figure 5 is a cross-section on the line 5—5 of Figure 1.

Figure 6:
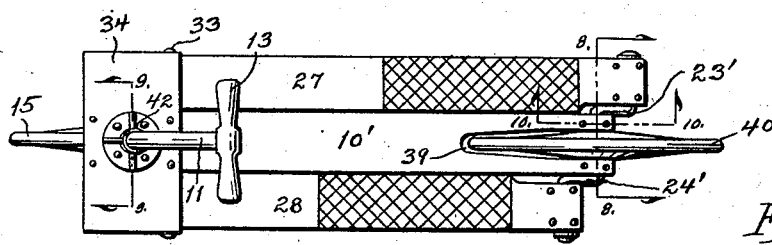
Figure 6 is a plan view of a modified form which employs only two ground wheels.
Figure 9:
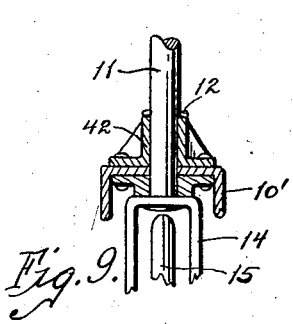
Figure 10:
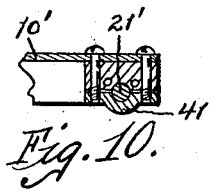
Figure 8:
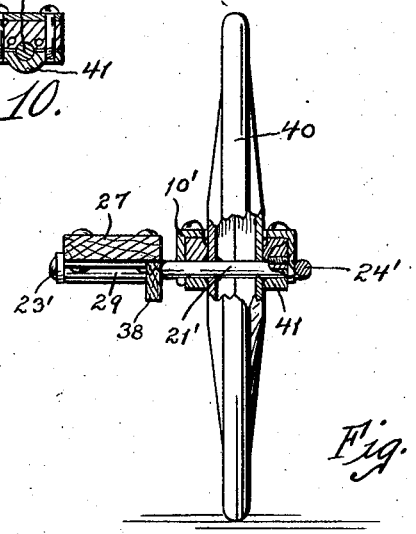
Figure 7:
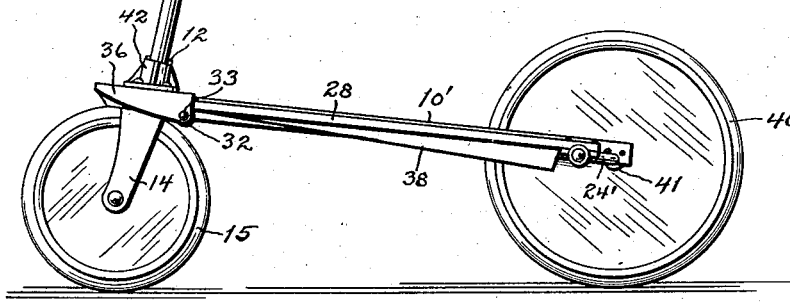
Figure 7 is a side elevation of the same.

Figures 8, 9 and 10 are detail sections on the respective lines 8—8, 9—9 and 10—10 of Figure 6.

In the construction of the device as shown in Figures 1 to 5 inclusive, the numeral 10 is employed to designate a central frame member and foot plate combined, which may be made of a wooden beam or other suitable material. A steering post 11 is arranged in substantially vertical position and extends rotatably through the forward portion of the frame member 10, and any suitable means, such as a pin 12, may be employed to prevent downward movement of the post through said member. The steering post 11 may be provided at its upper end with a cross bar or handle 13 or other suitable means for holding and manually turning it and the steering wheel. A fork 14 is formed on the lower end of the steering post 11, below the frame member 10, and a supporting and steering wheel 15 is journaled in said fork. The rear end portion of the central frame member 10 rests on and is supported by a cross frame member 16, which is formed with downwardly offset portions or "drops" 17 and 18, one at each side of the central portion which supports said central frame member. At its ends the cross frame member 16 is provided with bearings 19 and 20 which are in horizontal alinement with each other and also with the lower portion of the central frame member 10. An axle 21 is arranged transversely above the cross frame member 16 and has its end portions journaled in the bearings 19 and 20, and also has its central portion journaled in a notch 22 in the lower surface of the central frame member 10, said notch being closed after the axle is inserted, by applying the cross-frame member 16 and securing it in place. The axle 21 is formed with opposed cranks 23 and 24, one on each side of its center and in registration with the drops 17 and 18 of the cross frame member 16. Supporting and traction wheels 25 and 26 are fixed to end portions of the crank axle 21 and are located just outside of the bearings 19 and 20.

A pair of longitudinally extending pedal plates 27 and 28 are provided, and have at their rear ends bearings 29 and 30 respectively, on the respective throws or cranks 23 and 24 of the axle. The pedal plates 27 and 28 are located on opposite sides of and adjacent to the central frame member 10, and their forward portions extend across rollers 31 and 32 journaled on a bolt or rod 33 extending through the forward end of the central frame member. The forward end portions of the pedal plates 27 and 28 are adapted for reciprocal movement on the rollers 31 and 32 as their rear ends describe circular movements about the axis of the axle 16 with the cranks 23 and 24 thereof. A cover plate 34 is arranged above the forward ends of the pedal plates 27 and 28 and central frame member 10 and is fixed to the latter member, providing a shield for the forward ends of the pedal plates in their movement. The cover plate 34 is formed with a downwardly extending front flange 35 and side flanges 36 which serve to further enclose the forward ends of the pedal plates, and the ends of the bolt or rod 33 are further supported in the side flanges 36.

A cross brace 37 preferably is rigidly fixed to and connects the drops 17 and 18 of the cross frame member 16.

In practical use the operator stands with one foot on each pedal plate 27 or 28 and his weight is shifted alternately from one to the other, his legs and body being moved in such manner as to cause said pedal plates to describe oscillatory movements, their rear ends traveling in circular orbits and their forward ends reciprocating on the rollers 31 and 32. This movement of the pedal plates is communicated to the cranks 23 and 24 of the axle, causing the rear wheels 25 and 26 to be rotated and the vehicle propelled. The operator grasps the steering post 11 or handle 13 thereon to brace and steady himself and also to steer the vehicle.

Flanges 38 are fixed to and project downwardly from the side margins of the pedal plates 27 and 28, said flanges being of approximately the same width as the vertical spaces between said plates and the central frame member 10 when said plates are at the extremes of their up and down movement. The flanges 38 extend throughout major portions of the lengths of the pedal plates and it is their function to provide guards to prevent entrance of the operator's toes between said plates and the frame member during operation.

At times the operator may shift one or both feet from the movable pedal plates to the central frame member 10 when he wishes to rest or to coast. A braking effect may be applied to the pedal plates and through them to the rear wheels, by back pedalling. As the pedal plates are of substantially the same length as the vehicle frame, they have ample leverage on the crank axle, and the lever advantage may be varied by shifting the operator's position longitudinally.

In the construction according to Figures 6 to 10 inclusive, a single rear wheel is employed which is in longitudinal alinement with the steering wheel 15. The central frame member 10' is in this instance formed of a channel iron with its flanges directed downwardly, and in its rear portion it is formed with a narrow rearwardly opening notch 39 within which the forward portion of the rear wheel 40 projects. The cross frame member is omitted, and the crank axle 21' is journaled only in bearings 41 carried by the rear end of the central frame member 10'. The crank axle 21' terminates at the ends of the cranks 23' and 24'. The wheel 40 is fixed to the central portion of the crank axle 21' in any suitable manner. In other respects the construction and arrangement is similar to that previously described in connection with the three wheeled form of the vehicle.

In riding the two-wheeled vehicle, the operator must of course balance himself and the vehicle, in addition to propelling it in the manner previously described.

An elongated bearing 42 preferably is provided for the steering post 11 in this form of the device, and said bearing is carried by the horizontal portion of the channel frame member 10'. The guard flanges 38 of the pedal plates may be omitted if desired, particularly on the outer margins.

The wheels 25 and 26 of the preferred form have been referred to as traction wheels, but it is to be understood that if desired one only of said wheels may be made fast to the axle and the other be free thereon.

I claim as my invention—

1. In a scooter vehicle, a longitudinal frame member centrally arranged, a steering wheel at the forward end thereof, a crank axle journaled at the rear of said frame member and projecting on both sides thereof, said crank axle having a pair of opposed cranks, pedal plates arranged on opposite sides of said frame member and having bearings at their rear ends on said cranks, rollers supported at the forward end of said frame member on which the forward ends of said pedal plates are adapted to reciprocate, and a traction wheel fixed to the mid-portion of said crank axle between the cranks thereof and in alinement with said steering wheel.

2. In a scooter vehicle, a central longitudinal frame member, a steering wheel at the forward end thereof, a crank axle journaled at the rear of said frame member and projecting on both sides thereof, said crank axle being formed with a pair of opposed cranks on opposite sides of said frame member, pedal plates arranged parallel with said frame member and having bearings at their rear ends on said cranks and having their forward portions arranged for reciprocation, traction means secured to said crank axle, and a cover plate fixed to the forward portion of said frame member and covering the forward end portions of said pedal plates.

3. In a scooter vehicle, a central longitudinal frame member, a steering wheel at the forward end thereof, a crank axle journaled in its mid-portion at the rear end of said frame member, said crank axle being formed with opposed cranks on opposite sides of said frame member, pedal plates arranged parallel with said frame member and having bearings at their rear ends on said cranks, rollers carried by the forward end of said frame member upon which said pedal plates are arranged for sliding movement, traction means fixed to said crank axle, and a cover plate carried by the forward end of said frame member and provided with depending flanges, whereby the forward ends of said pedal plates are partially enclosed.

LOWELL E. WALTER.